(No Model.)   5 Sheets—Sheet 1.

H. A. RIFE.
MACHINE FOR DRESSING STONE.

No. 292,361.　　　　　　　　　Patented Jan. 22, 1884.

WITNESSES
Jas. E. Hutchinson.
J. C. Wildman

INVENTOR
Henry A. Rife
By H. A. Seymour
Attorney (No Model.)  5 Sheets—Sheet 2.
H. A. RIFE.
MACHINE FOR DRESSING STONE.
No. 292,361.  Patented Jan. 22, 1884.
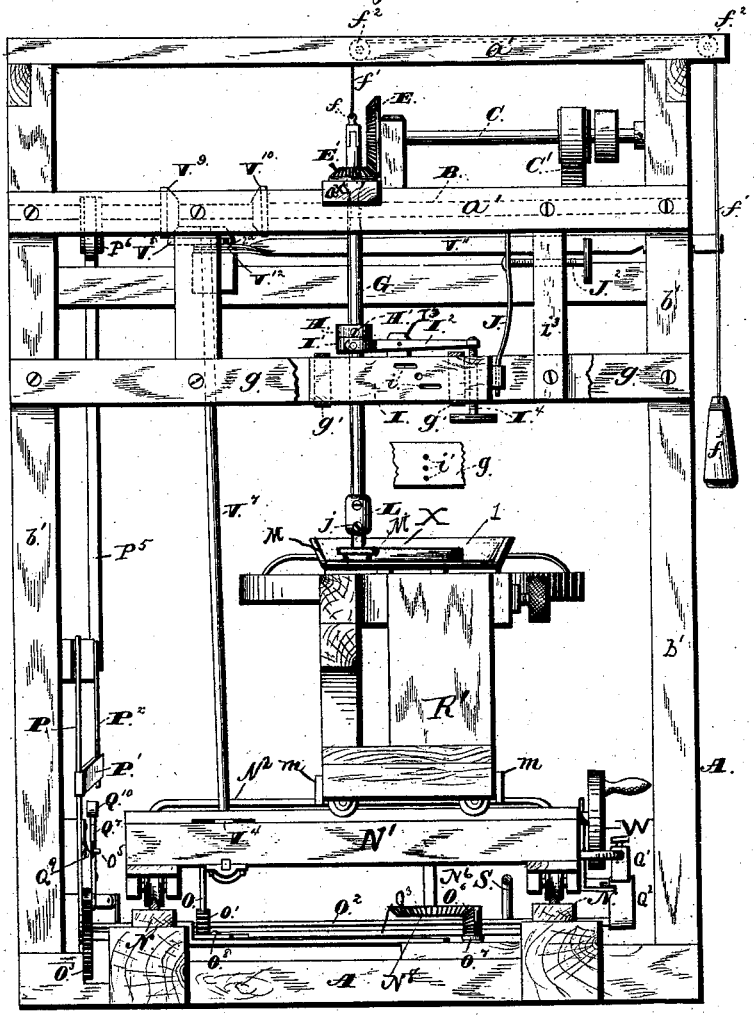
WITNESSES
Jas. E. Hutchinson.
J. C. Wildman.
INVENTOR.
Henry A. Rife.
B. F. A. Symons.
Attorney.

(No Model.) 5 Sheets—Sheet 3.
H. A. RIFE.
MACHINE FOR DRESSING STONE.
No. 292,361. Patented Jan. 22, 1884.
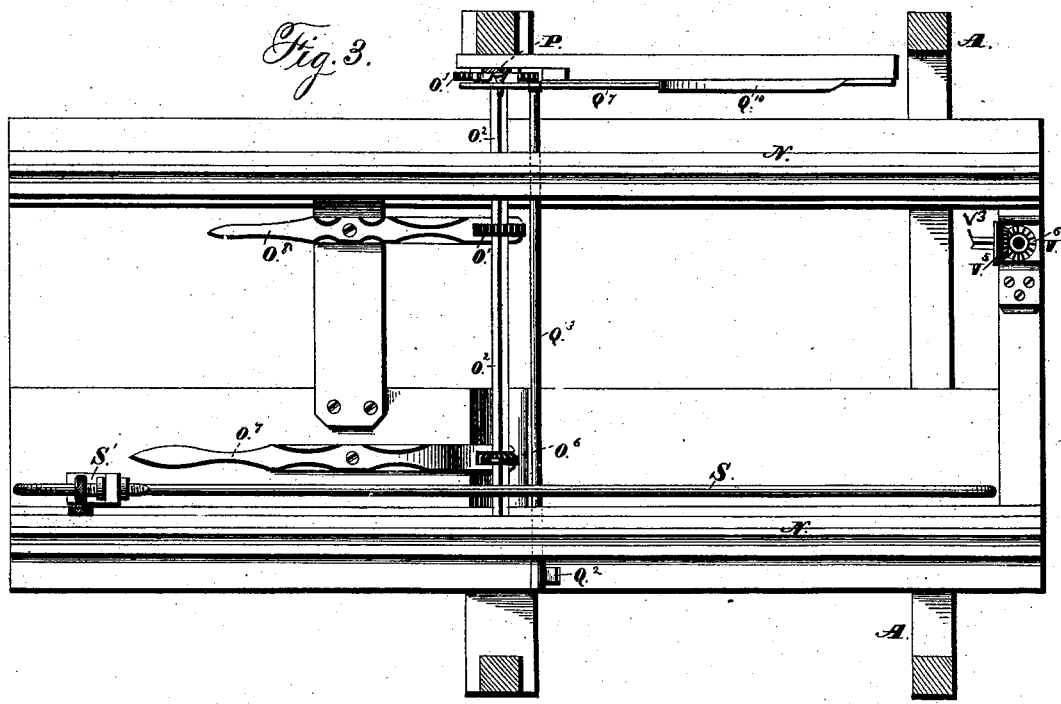
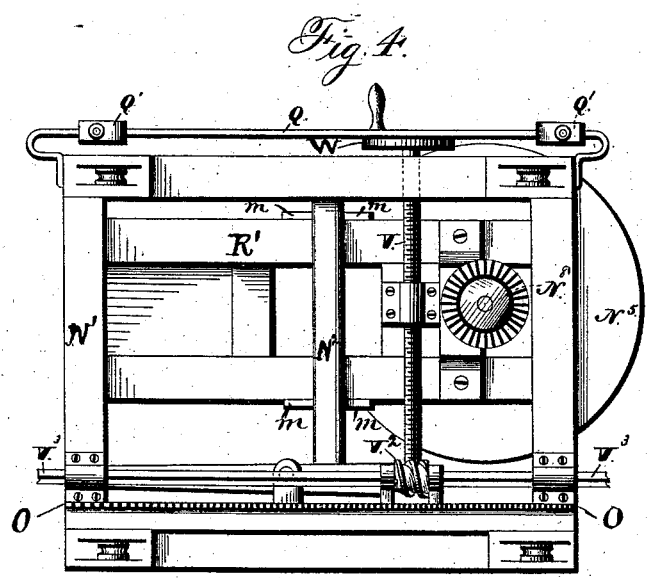
WITNESSES
Jas. E. Hutchinson.
J. C. Wildman.
INVENTOR
Henry A. Rife.
B. F. A. Symmon
Attorney (No Model.) 5 Sheets—Sheet 4.

H. A. RIFE.
MACHINE FOR DRESSING STONE.

No. 292,361. Patented Jan. 22, 1884.

WITNESSES
Jas. E. Hutchinson
J. C. Wildman

INVENTOR
Henry A. Rife
By H. A. Seymour
Attorney (No Model.)  5 Sheets—Sheet 5.
H. A. RIFE.
MACHINE FOR DRESSING STONE.
No. 292,361. Patented Jan. 22, 1884.
Fig. 6.
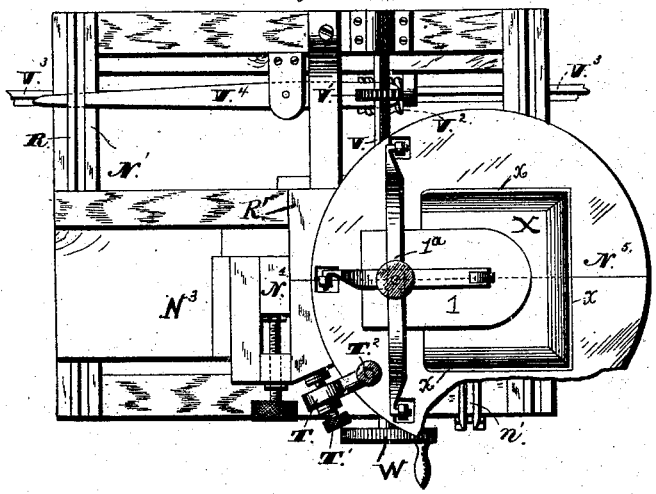
Fig. 7.
Fig. 8.
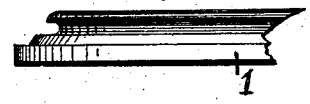
Fig. 9.
  
WITNESSES
Jas. E. Hutchinson
J. C. Wildman
INVENTOR
Henry A. Rife.
By H. A. Symnom,
Attorney

UNITED STATES PATENT OFFICE.

HENRY A. RIFE, OF TIMBERVILLE, VIRGINIA, ASSIGNOR OF ONE-HALF TO PETER S. FAHRNEY, OF SAME PLACE.

MACHINE FOR DRESSING STONE.

SPECIFICATION forming part of Letters Patent No. 292,361, dated January 22, 1884.

Application filed July 16, 1883. (No model.)

*To all whom it may concern:*

Be it known that I, HENRY A. RIFE, of Timberville, in the county of Rockingham and State of Virginia, have invented certain new and useful Improvements in Machines for Dressing Stone; and I do hereby declare the following to be a full, clear, and exact description of the invention, such as will enable others skilled in the art to which it appertains to make and use the same.

My invention relates to an improvement in machines for dressing stone, the object of the same being to provide mechanism whereby the surfaces of the stone and the sides and ends thereof can be dressed and molded without removing the stone from the table or changing its position relative to the said table.

My invention consists in the parts and combinations of parts, as will be more fully described, and pointed out in the claims.

Figure 1:
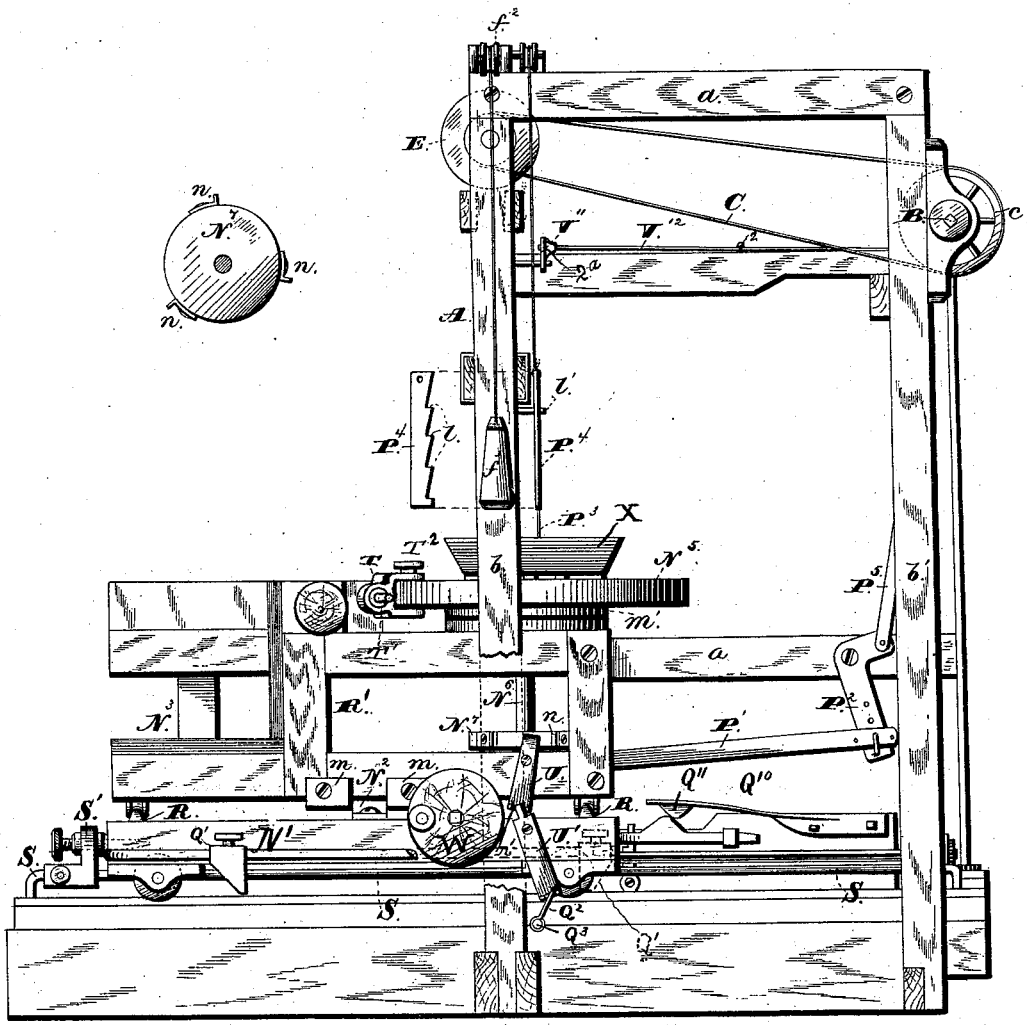
Figure 5:
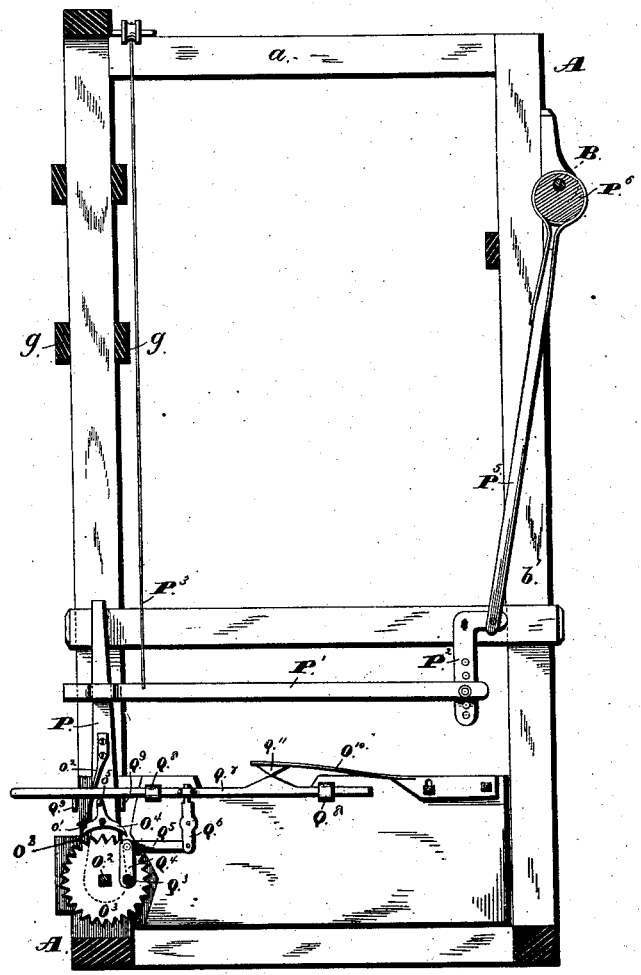

In the accompanying drawings, Figure 1 is a view in side elevation of my improved machine. Fig. 2 is a view in front elevation thereof. Fig. 3 is a plan view of the device with the carriage removed. Fig. 4 is a bottom plan view of the carriage. Fig. 5 is a view in vertical section of the machine-frame, showing the reversing mechanism. Fig. 6 is a plan view of the carriage. Fig. 7 is a view of one form of grinding-disk. Fig. 8 shows a portion of a slab, and Fig. 9 shows several forms of grinding-disks.

A represents the frame of the machine, composed of the horizontal beams $a$, cross-beams $a'$, and upright standards $b$ and $b'$, the said beams and standards being suitably braced to hold the parts in proper relative positions.

B is the drive-shaft, journaled in the upright standards $b'$, and provided with the belt-wheel $c$, which transmits the motion of the drive-shaft B to shaft C by means of the belt C'. The horizontal shaft C is suitably journaled in the machine-frame, and is provided at its free end with the bevel-gear wheel E, which meshes with the small bevel-wheel E' of the vertical shaft G. This vertical shaft G is preferably journaled or supported in the framework at two points, at the upper point, $a^x$, said shaft being, by a bevel-wheel, E', resting in a flaring socket, as indicated in dotted lines, so held as to permit the lower extremity of the shaft to vibrate, as hereinafter described, and said shaft is provided at its upper end with a swivel-hook, $f$, to which one end of the rope or chain $f'$ is secured. This rope or chain passes over suitable pulleys, $f^2$, and is provided at its other end with a weight, $f^3$, adapted to hold the grinding-disk elevated above the stone when necessary. The shaft G moves vertically, and is provided with a feather adapted to register with a groove in the wheel E', for the purpose of preventing the latter from turning independently of the shaft G.

H is a collar adjustably secured to the shaft G by the set-screw H', and adapted more particularly to limit the downward movement of the shaft. The grinding-disk is secured to the lower end of this shaft, and is adapted to bear directly on the stone being worked, and by means of this adjustable collar it can be elevated or lowered to accommodate itself to the thickness of the stone.

Between the lower movable bearing, I, of the shaft G and the collar H, and surrounding the said shaft, is a loose collar, I', to which the bifurcated ends of the lever I² are pivotally secured. This lever is pivotally secured to the upright standard I³ of the bearing I, and is connected at its outer end to the upper end of the regulating-screw I⁴, which has bearing in the movable shaft-bearing I. By means of this screw the collar I', and consequently the shaft G, can be elevated and lowered at pleasure to suit the stone being operated upon without the necessity of adjusting the collar H.

In some kinds of stone-molding it is necessary to provide means for automatically feeding the grinding-disk to the stone, so as to enable the operation to be completed without the necessity of moving thestone or altering the adjustment of the shaft G. This is accomplished by means of the movable bearing I and the spring J. The movable bearing I is suspended between the beams $g$ by the hangers or straps $g'$, in which it moves, and is connected at its rear end to the lower end of the flat spring J. The upper end of this spring is secured to the machine-frame, and the movement of the spring and movable bearing I is controlled by the screw J², which works in the standard i³. The inner end of this screw is swiveled to the spring J, preferably near the upper end thereof, and by turning it in one direction the spring forces the movable bearing away from the standard i³, and by turning it in the opposite direction the movable bearing and consequently the shaft G are drawn toward the said standard. Thus it will be seen that by first adjusting the stone and table so that the former will bear against the grinding-disk, and then operating the screw J² so that the tendency of the spring J will be to force the disk into the said stone, the machine can be started, and the disk will automatically feed itself toward the stone as the operation progresses.

In many instances it will be necessary to limit the penetration of the disk into the stone, and to accomplish this I have provided the movable bearing I with a series of horizontal slots, i, which may be of unequal lengths and placed in the same vertical plane. These oblong slots register, respectively, with small openings running transversely through the beams g. The slots i can be arranged in any desired manner, and by placing a pin through one of the openings i' and its corresponding slot i the bearing I is allowed to move only the length of the slot.

To the lower end of the vertical shaft G is secured the sleeve L. This sleeve is held in place upon the shaft G by a set-screw, and is provided near its lower end with a second set-screw, j, which latter bears against the upwardly-projecting arm of the grinding-disk M and secures the latter to the shaft G. These grinding-disks are preferably made of metal, and when in operation are submerged in sand or other suitable abrading material, as will be more fully described further on. These dies or disks used for molding the stone can be of any ornamental designs for molding monuments, table-slabs, &c.; or they can be perfectly plain for grinding simply the surfaces and edges of the stone. Again, if desired, polishing-rubbers, made of wood covered with felt or any other material, can be employed on this machine for polishing the stone after it is ground.

The base of the machine is provided with a trackway, N, on which the carriage N', which supports the table, moves. This carriage is preferably rectangular in shape, and is provided with suitable rollers having V-shaped grooves therein, which travel on the rails of the track and prevent the displacement of the carriage. This carriage is also provided on its under side with the rack-bar O, with which the small pinion O' of the shaft O² engages. This shaft O², which is preferably angular in cross-section, is provided at its outer end with the ratchet-wheel O³, with which the double pawl O⁴ engages. The double pawl is pivotally secured to the lever P, and the latter is in turn pivotally secured at its lower end to the shaft O². This double pawl is provided with a shoulder, o', with which the lower bent end of the spring o² engages, for the purpose of holding the pawl in engagement with the ratchet. The upper end of the spring o² is secured to the lever P, while the lower bent end thereof is adapted to engage respectively either the upper or lower face of the shoulder o', for moving the carriage forward and backward. When the carriage is moving forward—that is to say, when it is moving from under the machine-frame—the toe o³ of the pawl is in engagement with the ratchet, and when the toe o⁴ is in engagement with the ratchet the carriage is moved in the opposite direction. The lever P is operated by the pitman P', one end of which is slotted for the reception of the lever P, while the opposite end thereof is adjustably secured to the vertical arm of the bell-crank P². The pitman P' is free to be moved up and down on the lever P, and is connected to the lower end of the cord P³, which passes over pulleys in the machine-frame, and is provided at its opposite end with a plate, P⁴, having notches l therein. This plate is adapted to be hooked onto a nail or other projection, l', and can be adjusted for the purpose of lengthening or shortening the stroke of the lever.

When it is desired to shorten the stroke of the lever P for the purpose of decreasing the speed of the carriage, the plate P⁴ is drawn downwardly and secured by hooking the projection l' into one of the upper notches. This draws the end of pitman P', to which the cord P² is secured, upwardly near the top of the lever P, and consequently decreases the speed of the carriage by causing the pawl O' to take a decreased number of teeth at each stroke. To increase the speed of the machine, the pitman P' is moved toward the pawl. The bell-crank lever P² is pivoted to the machine-frame, and the horizontal arm thereof is connected to the lower end of the pitman P⁵, the upper end of which is provided with a ring embracing the eccentric P⁶ on the drive-shaft B.

From the foregoing it will be seen that when motion is imparted to the drive-shaft B from any source whatever it is transmitted to the carriage through the pitman, levers, pawls, shafts, and wheels before referred to, and also to the rotary grinding-disk. It is necessary, however, to provide means for automatically shifting or reversing the motion of the carriage when the latter has moved a sufficient distance; and to accomplish this end I have provided the carriage with the rigid side bar, Q, on which the stops Q' are adjustably secured by set-screws. These stops Q' necessarily move with the carriage, and alternately strike the upwardly-extending arm Q² of the tripping-bar Q³. This bar is journaled to the base of the machine under the trackway, and is provided at its opposite end with an upwardly-extending arm, Q⁴, (see Fig. 5,) to which one end of the pitman Q⁵ is pivotally secured. The opposite end of this pitman Q⁵ is secured to the lower end of the rocking lever $Q^6$. The upper end of the rocking lever $Q^6$ engages with the sliding bar $Q^7$, secured in the bearings $Q^8$, and moves the said sliding bar simultaneously with the movement of the tripping-bar. This sliding bar is provided at its outer end with two downwardly-projecting fingers, $Q^9$, situated, respectively, on opposite sides of the inwardly-projecting finger $o^5$ of the pawl $O^4$. Thus it will be seen that when the carriage has reached the limit of movement in one direction, one of the adjustable stops on the side bar strikes the upwardly-projecting arm of the tripping-bar. This bar is then turned, and through the intervention of the sliding bar and intermediate parts turns the pawl and throws the lower curved end of the spring to the opposite side of the shoulder $o'$. This movement of the pawl causes the opposite toe to engage the ratchet-wheel $O^3$, which then revolves in the opposite direction. The sliding bar is held in place by a spring-arm, $Q^{10}$, provided with the double-inclined projection, $Q^{11}$, adapted to engage a similarly-shaped projection on the sliding bar and prevent the latter from moving longitudinally only when the tripping-bar is turned.

The carriage $N'$ is provided transversely with the rails R, on which the table $R'$ rests and moves. This table is provided with rollers adapted to travel on the rails, and is also provided on opposite sides with the guide-plates $m$, adapted to embrace or partly embrace the guide-rod $N^2$, rigidly secured to the carriage. This construction firmly holds the table on the carriage and prevents the former from slipping or moving unnecessarily. This table is adapted to move laterally on the carriage, and is provided near its base with a step, $N^3$, for large blocks of stone, and higher up, and near the rotary table, with a clamp, $N^4$, by means of which small blocks are held in engagement with the grinding or polishing disks. This main table is also provided with a supplementary rotating table, $N^5$, on which the greater portion of the work is performed. This table $N^5$ is provided on its lower face with a plate, $m'$, between which and a similar plate secured to the carriage $R'$ friction-rollers (not shown) may be placed to afford a firm solid support for the said supplementary table, and also to enable the latter to readily turn when desired.

Depending from the center of the rotary table is the vertical shaft $N^6$, provided at or near its center with the tripping mechanism $N^7$, and at its lower end with the bevel-wheel $N^8$. This bevel-wheel is adapted to engage a small bevel-wheel, $O^6$, of the angular shaft $O^2$. This wheel $O^6$ and the wheel or pinion $O'$ are adapted to be moved on the shaft $O^2$ by the levers $O^7$ and $O^8$, respectively, out of or into engagement with the wheel $N^8$ and rack-bar O. When the carriage is moving longitudinally, the wheel $O^6$ is out of engagement with the wheel $N^8$, and when the supplementary table is rotating, the carriage is at rest, which is accomplished by throwing the wheel $O'$ out of engagement with the rack-bar O. When the supplementary table is rotating, it is necessary to secure the carriage against movement, and this is accomplished by the rod S and the lock $S'$. The rod S is situated under the table, and the lock $S'$ slides thereon, and is adapted to be secured thereto in the desired position by a set-screw. This lock is provided, preferably, with a screw-bolt adapted to engage the carriage and hold it firmly in position. This, however, is only necessary when the rotary table is revolving. When the carriage is moving longitudinally, the set-screw of the lock is loosened, and the lock moved beyond the travel of the carriage. It is also necessary to provide means for locking the rotary table to the table proper when the carriage is moving. This is accomplished by means of the clamp T, having a screw-bolt, $T'$, swiveled therein, which latter is adapted to engage the table $R'$ and hold the rotary table against displacement. The clamp T is secured to the rotary table by a thumb-screw, $T^2$, and when it is desired to revolve the rotary table the clamp T is easily removed therefrom. The rotary table is preferably provided with a straight line or other mark running centrally across its upper surface for the purpose of enabling the operator to set the stone properly. This mark is adapted to register with a similar mark on the table proper, and when a stone is placed on the table with the side edge of the stone to be operated on parallel with the central mark on the rotary table, the screw-bolt $T'$ can be turned until the mark or score on the rotary table registers with the mark on the table proper. This insures even and uniform grinding through the whole length of the stone, and obviates the necessity of moving or changing the position of the grinding-disk or of touching the stone.

The depending shaft $N^6$, as before stated, is provided with the tripping mechanism $N^7$. This tripping device consists simply of a wheel having adjustable stops $n$ secured thereto. These stops $n$ project outwardly from the surface of the wheel, and are adapted to engage the upper bent end of the lever U. This lever is pivotally secured to the base of the table, and the lower end thereof is bent outwardly, and provided with an elongated slot, $n'$, (see Fig. 6,) in which the upper end of the lever $U'$ works. This lower lever, $U'$, is pivoted to the carriage immediately below the lever U, the upper end thereof being adapted to engage the lever U, while the lower end, which is bent outwardly and slotted, is adapted to engage and partly embrace the upwardly-extending arm of the tripping-bar, which, as before stated, reverses the movements of the parts.

Suppose, for the sake of illustration, that it is desired to mold the curved top of a gravestone or monument. In the first place it is necessary to adjust the stone properly on the rotary table, so that the end or curved portion thereof will move concentrically to the grinding-disk. The carriage is then locked and the locking-clamps removed from the rotary table. The device is then started and the motion of the parts transmitted directly to the rotary table by the mechanism before described. This table turns in one direction until one of the stops of the reversing mechanism of the table strikes the lever U. As the stop strikes the lever, the latter, through the lever U', tripping-bar, and connected mechanism, turns the pawl and causes the opposite toe thereof to engage the ratchet-wheel $O^1$. This reverses the motion of the table, which motion continues until the second stop is reached, when the motion is again reversed, and so on continuously until the operation is completed. By making an oblong slot in the outwardly-extending portion of the lever U, the carriage can be moved laterally by the mechanism, to be hereinafter described, without altering or touching the reversing mechanism. When it is desired to give the table a reciprocatory motion instead of a rotary motion, as above described, the levers U and U' are disengaged from each other by simply turning the latter on its pivot until it rests in a horizontal position.

V is a screw-shaft suitably journaled transversely to the carriage, and meshing with a female screw-threaded bearing rigidly secured to the base of the table. This screw is provided with a pinion, V', adapted to be moved longitudinally thereon, which screw meshes with the worm $V^2$, journaled to the carriage, and mounted on an angular shaft, $V^3$. This shaft is made angular so as to enable it to turn the worm, while the latter moves longitudinally with the carriage. The pinion $V'$ is moved to and away from the screw-shaft by the lever $V^4$ pivotally secured to the carriage. The angular shaft $V^3$ is supported in suitable bearings, and is provided at its outer end with the bevel wheel $V^5$, which latter meshes with the bevel-wheel $V^6$, secured to the lower end of the vertical shaft $V^7$. This shaft is also supported in the machine-frame at its upper and lower ends, the latter being stepped in a loose socket, or otherwise, in order to permit the vibrations, hereinafter described, of the upper end of said shaft, and the shaft $V^7$ is provided at its upper end with a bevel-wheel, $V^8$, adapted to register, respectively, with the wheels $V^9$ and $V^{10}$, rigidly secured to driving-shaft B on opposite sides of the wheel $V^8$. The wheel $V^8$ normally rests between the wheels $V^9$ and $V^{10}$ without engaging with either, and the upper end of the shaft $V^7$, to which the wheel $V^8$ is secured, is free to be moved sidewise by the levers $V^{11}$ and $V^{12}$, so as to bring the wheel $V^8$ in engagement with either wheel. The lever $V^{12}$ is pivoted at 2, Fig. 1, to the frame, and is jointed at its rear end to the lever $V^{11}$, as shown at $2^a$, Figs. 1 and 2, and the lever $V^{11}$, which extends transversely of the frame, is notched at its outer end, as seen in Fig. 2. It will be seen that by pulling on the lever $V^{11}$ the front end of the lever V will be drawn toward the wheel $V^9$, carrying the wheel $V^8$ with it, and causing the latter to mesh with the former. A push upon the lever $V^{11}$ will cause the wheel $V^8$ to mesh with the wheel $V^{10}$. At either limit of its movement the lever $V^{11}$ is retained by setting one of its notches in a pin or projection (not shown) upon the contiguous bar. By this means I am enabled to reverse the lateral motion of the table without stopping the machine. The lateral motion of the table can also be produced by the hand-wheel W, rigidly secured to the outer end of the screw-shaft V. The hand-wheel is used simply for adjusting the table laterally to suit the size of the stone, while the other mechanism described for accomplishing the same result is employed for moving the table while grinding or polishing the ends of the stone.

The stone slabs or blocks (shown at 1, Figs. 6 and 8) to be ground, polished, or molded are first trimmed off with much less labor than in the usual way, as the tool with the abrader does the work after the main part is removed in a rough way. If there are any curved ends to be molded, the stone is so fixed on the table that the said curved ends will move concentrically to the grinding-disk. The stone can, if desired, be held in place by a suitable clamp, $1^a$, Fig. 6, consisting of a bar or strut, extending across the table $N^5$ and held at its ends beneath staples or straps secured to the table, and also of a bar extending at right angles to the strut and beneath it, and removably secured at one end to the table by a strap or staple, while resting at its opposite end upon the stone 1. A screw-threaded presser-pin is passed through the middle of the strut and presses downward upon the bar. This clamp, however, is not always necessary, as the weight of the stone is generally sufficient to hold it in place. A trough, X, is placed upon the table $N^5$, around the stone, and is formed with three sides, $x$, for the purpose of holding a quantity of sand placed within the trough. The proper die or disk, having previously been secured to its shaft, is now lowered into the sand and adjusted to bear against the portion of the stone to be operated on, and the machine is started. Suppose, for the sake of convenience, that an ordinary head-stone is to be molded. The carriage would be adjusted so as to move the length of one side and then return. This motion would be continued until the grinding operation was completed, when the motion of the carriage would be stopped and the rotary motion of the table begun. The table would then reciprocate, carrying the curved or rounded end of the stone around in contact with the disk until the rounded end was completed, when the table would be moved laterally, so as to bring the opposite side edge in position to be operated on, and so on until completed.

From the foregoing it will be seen that the surface and edges of a stone can be ground, polished, or molded without removing the stone from the table after it is once placed thereon. Again, by the locks and reversing mechanisms before described, I am enabled to operate on stone of any desired shape and produce many beautiful and ornamental designs.

Fluted work can also be performed by stopping the motion of the carriage, so that the grinding-disk will press continuously on a portion of the stone until it has been ground away sufficiently, then withdrawing the disk from the recess thus formed, and moving the carriage in the necessary direction, and again stopping the same and forcing the disk against the stone, and so on until the operation is completed.

In ornamenting a stone it is only necessary that the sand-trough be as deep as the die; but for grinding or polishing the sides the trough can be supplanted by a box or frame, which will enable the die to reach from the upper to the lower surface of the stone.

The machine is made of any material best suited for the purpose in view, and the journals and boxes of the several parts are covered so as to protect them from the sand and water which falls from the stone. The water can be fed to the stone from any convenient point above the same.

It is evident that numerous changes in the construction and relative arrangement of the several parts might be resorted to without departing from the spirit of my invention; and hence I would have it understood that I do not confine myself to the exact construction shown and described, but consider myself at liberty to make such changes and alterations as fairly fall within the spirit and scope of my invention.

Having fully described my invention, what I claim as new, and desire to secure by Letters Patent, is—

1. In a machine for dressing stone, the combination, with a grinding-disk and a supporting-table, of a trough for holding abrading material mounted upon said table, and arranged to receive the slab or stone to be operated upon by the grinding-disk.

2. The combination, with an adjustable shaft, a grinding-disk removably secured to the lower end thereof, and connections for adjusting said shaft, substantially as described, of a carriage arranged to move under said disk, and a table arranged to move laterally upon said carriage, and carrying a trough to receive abrading material and to receive the grinding-disk, substantially as and for the purpose set forth.

3. The combination, with device for cutting or dressing stone, of a table consisting of a step for large blocks of stone, a clamp for holding small pieces, and a rotary or supplemental table.

4. The combination, with a grinding-disk, of a carriage, a table arranged to move laterally upon said carriage, a supplementary rotary carriage, mechanism for moving the carriage and for moving the table, and mechanism for reversing the movement of the carriage and of the table.

5. The combination of a stone-supporting table, a vertical shaft carrying a grinding-disk, devices mounted upon a movable bearing for adjusting said shaft, and a weight and cord for holding said shaft and disk elevated above the table, substantially as set forth.

6. The combination, with a stone-supporting table, a vertical rotary shaft carrying a grinding-disk, an adjustable collar, secured to said shaft above the disk, and connections mounted upon a movable bearing and arranged to engage with the collar for the purpose of adjusting the shaft, substantially as described.

7. The combination, with a stone-supporting table and a vertical shaft carrying a grinding-disk, of a movable bearing for supporting said shaft, and attachments for limiting the movements of said bearing.

8. The combination, with a vertical shaft, having a fixed and a movable bearing, of a spring bearing at one end against the movable bearing and secured at its opposite end to the machine-frame, a pin or bolt for limiting the movement of said bearing, a grinding-disk secured to said vertical shaft, and a table for supporting the stone to be acted upon by said disk, substantially as herein specified.

9. The combination, with a lever carrying a double pawl, a ratchet-wheel acted upon by said pawl, a spring for holding the pawl into engagement with the ratchet-wheel, and a shaft carrying a pinion, of a carriage provided with a rack arranged to engage with said pinion, and mechanism for reversing the position of the pawl.

10. The combination, with a shaft, a pinion and a ratchet-wheel secured on said shaft, and a carriage having a rack-bar with which the pinion engages, of a lever pivoted to the shaft, a pawl secured to said lever, and mechanism for regulating the speed of the carriage.

11. The combination, with a shaft, a pinion and a ratchet-wheel secured to said shaft, and a carriage having a rack-bar with which the pinion engages, of a lever pivoted to the shaft, a pawl pivoted to the lever, a pitman one end of which is adjustably secured to said lever, devices for imparting motion to the pitman, and a cord and notched plate for holding the adjustable end of the pitman in position.

12. The combination, with a shaft, a pinion and ratchet-wheel secured to said shaft, and a carriage having a rack-bar engaged by said pinion, of a lever pivoted to the shaft, a spring actuated-pawl secured to the lever, a bell-crank, a driving-shaft carrying an eccentric, a pitman connecting said bell-crank with said eccentric, an adjustable pitman connecting the pivoted lever with the bell-crank, and a cord and notched plate for adjusting the said adjustable pitman.

13. The combination, with a lever carrying a double pawl, a ratchet-wheel, a spring for holding the pawl in engagement with said ratchet-wheel, and a shaft carrying a pinion, of a carriage provided with a rack arranged to engage with said pinion, and a trip-bar carrying adjustable stops, an arm mounted upon said shaft and arranged to engage with said stops, and mechanism connected with said bar for reversing the movements of said carriage.

14. The combination, with a carriage provided with adjustable stops and a rack-bar secured to said carriage, of a shaft, a pinion and a ratchet-wheel secured to said shaft, a lever pivoted to the shaft, the double pawl pivoted to the lever, the spring secured to the lever for holding the pawl in engagement with the ratchet-wheel, the trip-bar, and the sliding rod indirectly connected to the trip-bar, and provided with depending fingers adapted to engage the pawl for the purpose of changing the direction of movement of the carriage.

15. The combination, with the carriage, shaft, pinion, ratchet-wheel, lever, and pawl, of the trip-bar, the sliding rod having depending fingers for engagement with the pawl, and the spring for steadying the sliding rod, substantially as set forth.

16. The combination, with a rotary grinding-disk, and an angular shaft carrying two wheels movably arranged thereon, of a main carriage carrying a rack-bar arranged to be engaged by one of said wheels, a carriage arranged to rest movably upon said main carriage and carrying a rotary table, and a shaft depending from said table and carrying a wheel arranged to engage with the other wheel upon the said angular shaft, substantially as and for the purpose set forth.

17. The combination, with the carriage, of the table movable laterally on the carriage, the supplementary table, and the clamp having a screw-bolt by which it is secured to the supplementary table, and also a screw-bolt to engage the table proper, substantially as set forth.

18. The combination, with the rotary table, connections for operating the same, and a vertical shaft depending therefrom, of the trip mechanism, the lever U, and the lever U', all of said parts being combined and arranged to operate as described.

19. The combination, with the carriage and table, of the screw-shaft, a movable spur-wheel thereon, a worm-wheel journaled to the carriage, and arranged to engage the spur-wheel and turn the screw-shaft, a shaft constructed, as described, for operating the worm-wheel, a vertical shaft having a bevel-wheel thereon, the drive-shaft having two bevel-wheels thereon, and a lever for moving the upper end of the vertical shaft, whereby the wheel thereon is caused to mesh with one of the wheels on the drive-shaft, substantially as set forth.

In testimony whereof I have signed this specification in the presence of two subscribing witnesses.

HENRY A. RIFE.

Witnesses:
 W. C. McALLISTER,
 W. W. ROLLER.